United States Patent [19]

Tsuchida et al.

[11] 4,438,425

[45] Mar. 20, 1984

[54] MULTIPLE SIGNAL TRANSMITTING APPARATUS FOR AUTOMOBILES

[75] Inventors: Takashi Tsuchida, Chiryu; Nobuo Kondo, Anjo; Kazukiyo Okada, Kosai; Yutaka Okuda, Kariya, all of Japan

[73] Assignee: Nippondenso Co., Ltd., Kariya, Japan

[21] Appl. No.: 292,431

[22] Filed: Aug. 14, 1981

[30] Foreign Application Priority Data

Aug. 21, 1980 [JP] Japan ............................. 55-114923

[51] Int. Cl.$^3$ .............................................. B60Q 1/00
[52] U.S. Cl. ..................................... 340/55; 250/551; 340/56; 340/672; 340/686; 340/825.62
[58] Field of Search ................... 340/52 F, 53, 55, 56, 340/73, 672, 54, 686; 307/10 LS; 180/78, 333; 315/80, 81; 364/424; 200/61.54, 61.57; 250/551

[56] References Cited

U.S. PATENT DOCUMENTS

| | | | |
|---|---|---|---|
| 3,544,743 | 12/1970 | Takei et al. ..................... | 200/61.54 |
| 4,190,318 | 2/1980 | Upton, Jr. ....................... | 250/551 X |
| 4,264,891 | 4/1981 | Bergmann et al. ............... | 340/56 |
| 4,275,379 | 6/1981 | Nakano et al. ................... | 340/55 X |
| 4,321,474 | 3/1982 | Tanaka et al. .................... | 250/551 |
| 4,323,877 | 4/1982 | Morita et al. ..................... | 340/56 |

FOREIGN PATENT DOCUMENTS 2381653 10/1978 France .................. 180/78

Primary Examiner—David L. Trafton
Assistant Examiner—Joseph Nowicki
Attorney, Agent, or Firm—Cushman, Darby & Cushman

[57] ABSTRACT

A multiple signal transmitting apparatus for automobiles includes a plurality of switches mounted on the steering wheel of an automobile, a multiplexing circuit mounted on the steering wheel for multiplexing the output signals of the switches, at least one light-emitting device mounted on a moving part rotatable together with the steering wheel so as to be arranged on a circumference lying in a plane perpendicular to the central axis of rotation of the steering wheel and concentric with the central axis of rotation to generate a light signal in response to the multiplexed output signal of the multiplexing circuit, at least one light-sensitive device mounted on the surface of the steering wheel bearing portion facing the light-emitting device to receive the light signal from the light-emitting device and generate an output signal, and a decoder circuit mounted on the body portion of the automobile to decode the output signal of the light-sensitive device to generate signals corresponding to the output signals of the switches.

7 Claims, 10 Drawing Figures

| DISCRIMINATION SIGNAL | 4 | 2 | 1 | 4 | 2 | 1 | 4 |
|---|---|---|---|---|---|---|---|
| LED | 11D | 11E | 11F | 11A | 11B | 11C | 11D |
| INITIAL CONDITION ① | | | | O | | | |
| 60° ROTATION TO RIGHT ② | | | | | O | | |
| 120° ROTATION TO RIGHT ③ | | | | | | O | |
| 180° ROTATION TO RIGHT ④ | | | | | | | O |
| 60° ROTATION TO LEFT ⑤ | | | O | | | | |
| 120° ROTATION TO LEFT ⑥ | | O | | | | | |
| 180° ROTATION TO LEFT ⑦ | O | | | | | | |

PHOTO-TRANSISTOR

MULTIPLE SIGNAL TRANSMITTING APPARATUS FOR AUTOMOBILES

BACKGROUND OF THE INVENTION

1. Field of the Invention

The present invention relates to multiple signal transmitting apparatus for automobiles and more particularly to a multiple signal transmitting apparatus in which a plurality of switches are arranged on the steering wheel of an automobile such that the signals from the switches are multiplexed, converted to a light signal and then transmitted to the vehicle body side where the light signal is received, restored to the multiplexed signal and decoded to selectively operate the loads associated with the respective switches.

2. Description of the Prior Art

In the automobiles now in use, a turn signal switch is installed on the body side below a steering wheel. With this arrangement, in order to close the turn signal switch with the steering wheel being in a position rotated 90 degrees, the driver must leave his hands off the steering wheel and there is the danger of causing problems from the standpoint of safe driving.

Also, the driver closes the turn signal switch to signal a right turn or left turn and the cancellation of the switch is effected by turning the switch off mechanically by a cam mechanism which is operated when the steering wheel is returned to the home position. However, this method is disadvantageous in that the life of the system is reduced due to the use of the mechanical mechanism and the system tends to cause troubles.

The present invention has been made with the intention of overcoming the foregoing deficiencies in the prior art.

SUMMARY OF THE INVENTION

It is the object of the present invention to provide a multiple signal transmitting apparatus for automobiles which includes a plurality of switches arranged on the steering wheel of an automobile, a plurality of light-emitting devices arranged on a plane rotatable together with the steering wheel, and a light-sensitive device arranged on a plane on the vehicle body side facing the light-emitting device mounted plane, whereby the signals from the switches are multiplexed and transmitted in the form of a light signal from the light-emitting device side to the light-sensitive device side, and also the rotary movement of the steering wheel is detected in accordance with the shifting of the light signals received at the light-sensitive device side due to the shifting of the position of the light-emitting devices caused by the turning of the steering wheel.

More precisely, it is the object of the present invention to provide a multiple signal transmitting apparatus for automobiles in which a plurality of turn signal switches and a plurality of light-emitting devices are mounted on the steering wheel of an automobile and a light-sensitive device is mounted on the vehicle body side whereby the signals from the turn signal switches and the discrimination signals indicative of the mounting positions of the light-emitting devices are converted to a multiplexed signal, converted to a light signal by the light-emitting device and then transmitted to the vehicle body side where the light signal is received by the light-sensitive device to convert the signal again to an electric signal and restore the multiplexed signal which in turn is decoded, thus selectively operating the turn signal lamps on the vehicle body side and also detecting the shifting of the light-emitting device discrimination signals to detect the rotation of the steering wheel and stop the operation of the turn signal lamps and thereby allowing the driver to turn on the turn signal switch while holding the steering wheel and making it possible to cancel the turn signal switches without using any mechanical mechanism.

BRIEF DESCRIPTION OF THE DRAWINGS

FIG. 2c also shows an arrangement of light-sensitive devices.

DESCRIPTION OF THE PREFERRED EMBODIMENTS

The present invention will now be described in greater detail with reference to the embodiment shown in the accompanying drawings.

Figure 1:
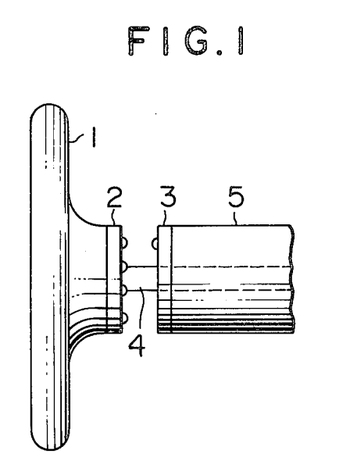
FIG. 1 is a schematic diagram of an embodiment of a multiple signal transmitting apparatus according to the present invention, showing the manner in which its light-emitting devices and light-sensitive device are respectively mounted on a steering wheel and its bearing.

In FIG. 1 illustrating an embodiment of a multiple signal transmitting apparatus according to the invention showing particularly the manner of mounting its light-emitting devices and light-sensitive device on a steering wheel and its bearing, respectively, numeral 1 designates a steering wheel, 2 a rotating part on the steering wheel on which light-emitting devices are mounted, 3 a fixed part on a bearing on which a light-sensitive device is mounted, 4 a steering shaft, 5 a part comprising a bearing or the like which is fixed to a vehicle body and supports the steering shaft. Although not shown in the Figure, the rotating part 2 and the fixed part 3 are enclosed by a cover such that the light-sensitive device receives no light rays other than the light emitted from the light-emitting devices.

Figure 2A:
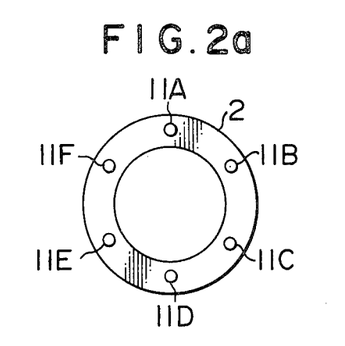
FIGS. 2a and 2b are diagrams respectively showing the arrangement of the light-emitting devices and the light-sensitive device in the embodiment of the invention shown in FIG. 1.
Figure 2B:
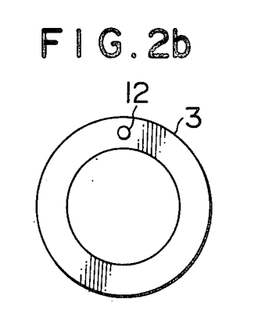

FIG. 2a is a schematic diagram showing the arrangement of the light-emitting devices on the rotating part 2 of FIG. 1 as viewed from the direction of the shaft of the steering wheel. FIG. 2b is a schematic diagram showing the arrangement of the light-sensitive device on the fixed part 3 of FIG. 1 as viewed from the direction of the steering wheel shaft. Numerals 11A and 11F designate light-emitting diodes (LEDs) forming the light-emitting devices, and 12 a phototransistor forming the light-sensitive device. The light-emitting devices 11A to 11F and the light-sensitive device 12 are respectively arranged along circumferences each having its center positioned at the center line of the shaft 4 so as to face each other and permit the transmission of light signals between the light-emitting devices and the light-sensitive device. In FIG. 2a, the LEDs 11A and 11F are arranged along the circumference so as to be spaced apart by 60° from one another.

Figure 3:
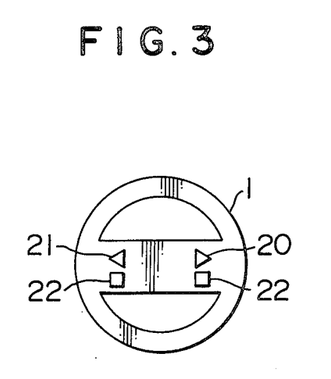
FIG. 3 is a diagram showing the arrangement of horn switches, a right turn switch and a left turn switch which are mounted on the steering wheel.
Figure 4:
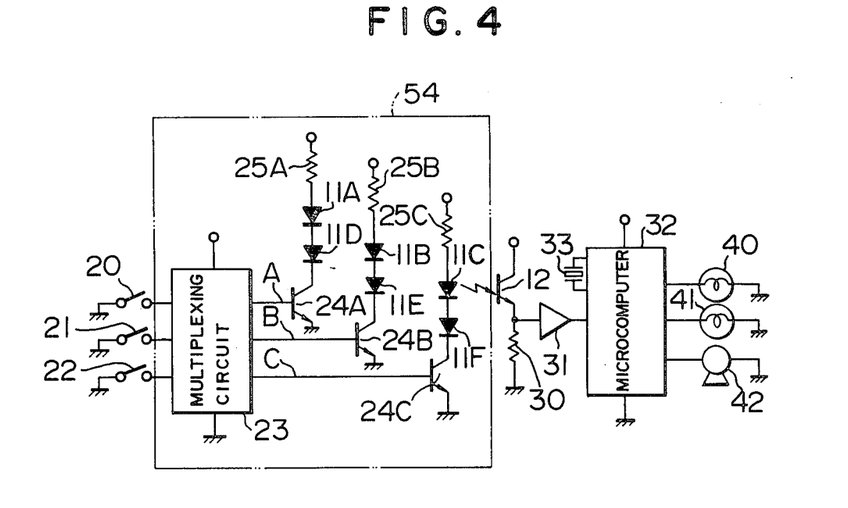
FIG. 4 is a circuit diagram of the multiple signal transmitting apparatus according to the embodiment of the invention.

FIG. 3 is a schematic diagram showing by way of example the arrangement of switches on the steering wheel 1. In the Figure, numeral 20 designates a right turn switch, 21 a left turn switch, and 22 horn switches. FIG. 4 is a circuit diagram of the embodiment shown in FIG. 1. In a light transmitting section 54, numeral 23 designates a multiplexing circuit for multiplexing the on-off signals from the switches 20, 21 and 22 to generate the three different types of multiplexed signals A, B and C shown in FIG. 5, and 24A to 24C transistors forming LED drive circuits which are responsive to the outputs of the multiplexing circuit 23 to supply current to the LEDs 11A to 11F. Numerals 25A to 25C designate resistors for limiting the current flow to the LEDs 11A to 11F. Numeral 12 designates the phototransistor responsive to the light signal from the LED to restore the multiplexed signal, 30 a load resistor of the phototransistor 12, 31 an amplifier circuit, and 32 a microcomputer forming a signal processing unit whereby in accordance with a predetermined control program the restored multiplexed signal is decoded to selectively operate a right turn lamp 40, a left turn lamp 41 and a horn 42. The microcomputer 32 is connected to a crystal unit 33 of several MHz and is operable in response to the power from a 5-volt stabilized power supply (not shown).

Figure 5:
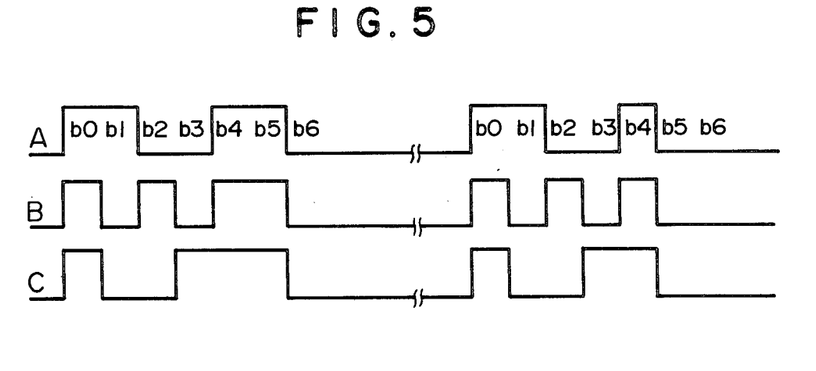
FIG. 5 is a waveform diagram showing the multiplexed signals in the embodiment of the invention.

FIG. 5 is a waveform diagram showing the waveforms of multiplexed signals generated from the multiplexing circuit 23. In each frame of the multiplexed signals A, B and C, a bit $b_0$ is a start bit and it is always a "1" signal. Symbols $b_1$, $b_2$ and $b_3$ are discrimination signals for respectively discriminating the circumferential mounting positions of the LEDs 11A and 11D, 11B and 11E and 11C and 11F on the rotating part 2. The multiplexed signal A is assigned with $b_1=1$, $b_2=0$ and $b_3=0$, the multiplexed signal B with $b_1=0$, $b_2=1$ and $b_3=0$ and the multiplexed signal C with $b_1=0$, $b_2=0$ and $b_3=1$. The multiplexed signal A is the input signal to the transistor 24A and the multiplexed signal B is the input signal to the transistor 24B. The multiplexed signal C is the input signal to the transistor 24C. A bit $b_4$ is a horn switch signal and its "1" and "0" states respectively represent the "on" and "off" conditions of the horn switch 22. A bit $b_5$ is a right turn signal and "1" and "0" respectively represent the "on" and "off" conditions of the right turn switch 20. A bit $b_6$ is a left turn signal and "1" and "0" respectively represent the "on" and "off" conditions of the left turn switch 21.

When the corresponding one of the bits of each multiplexed signal is "1" at its time position, the current is supplied to the corresponding one of the LEDs 11A to 11F during the bit time causing it to emit light.

When the light is received, the phototransistor 12 is turned on so that a current is supplied to the load resistor 30 and a voltage is generated across the load resistor 30. This voltage signal is amplified by the amplifier circuit 31 and transmitted to the microcomputer 32. In response to the arrival of a signal corresponding to the start bit $b_0$, the microcomputer 32 detects the arrival of a multiplexed signal so that the data of the bits $b_1$ to $b_6$ are detected from the multiplexed signal at their time positions and the signals for operating the loads associated with the switches or the horn 42, the left turn lamp 41 and the right turn lamp 40 are selectively generated. In this way, the horn 42, the left turn lamp 41 and the right turn lamp 40 are selectively operated.

Figure 6:
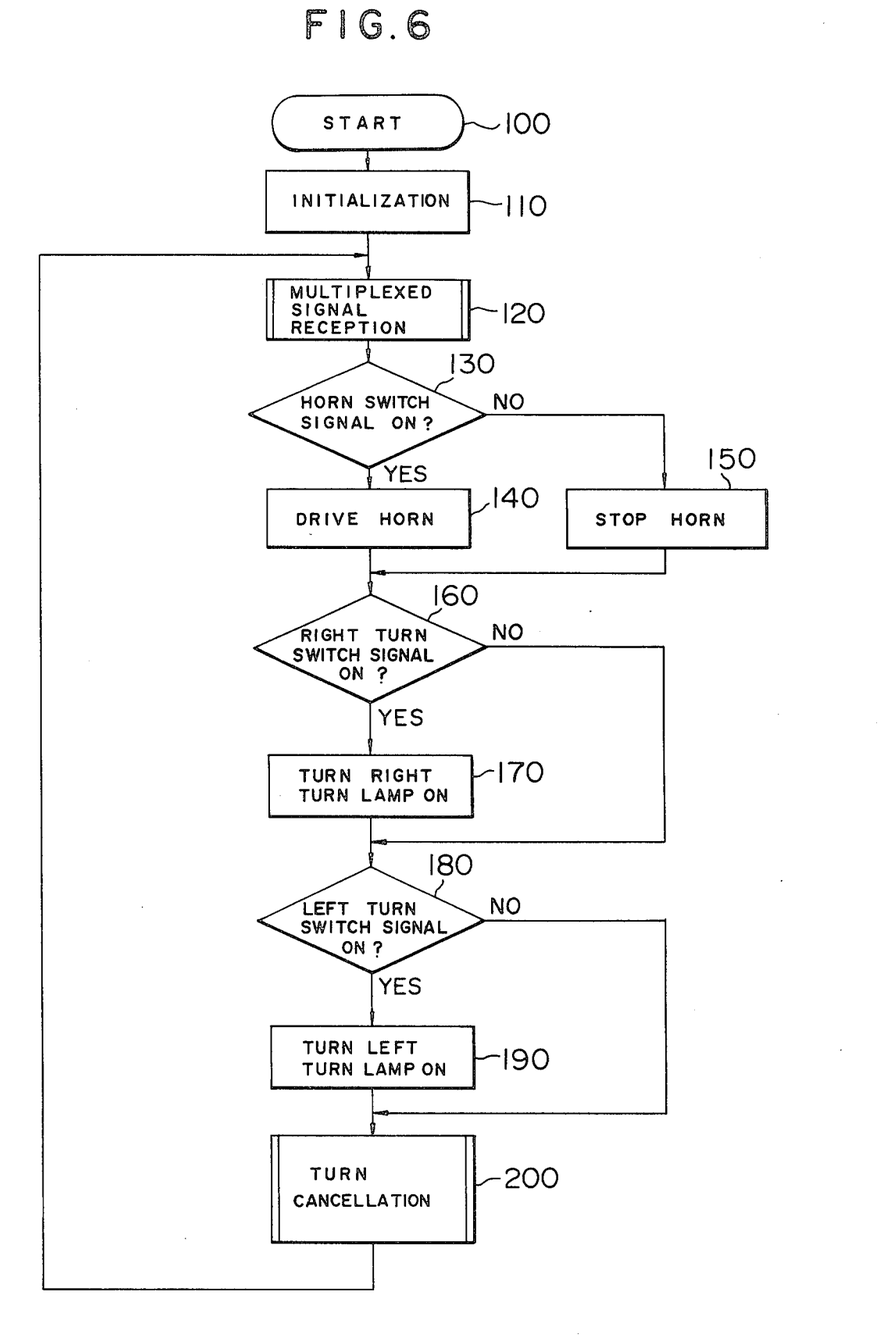
FIG. 6 is a flow chart showing the computing operations of the microcomputer in the embodiment of the invention.

FIG. 6 is a flow chart showing the computing operations of the microcomputer 32. When the stabilized voltage is applied to the microcomputer 32, it comes into operation and executes the computing operation in accordance with the control program. More specifically, the processing is started by a start step 100 so that the control is transferred to an initialization routine 110 and the registers, counters, etc., in the microcomputer 32 are set to their initial states necessary to start the processing. After the initialization has been completed, the control is transferred to a multiplexed signal reception routine 120. The multiplexed signal reception routine 120 receives a series of bit signals including from the start bit $b_0$ to the left turn switch signal $b_6$ in the multiplexed signal shown in FIG. 5 and then the control is transferred to a horn switch signal decision step 130. If the bit $b_4$ or the horn switch signal is "1", the decision of the horn switch signal decision step 130 results in "YES" and the control is transferred to a horn drive step 140 thus operating the horn 42. If the horn switch signal bit $b_4$ is "0", the decision results in "NO" so that the control is transferred to a horn drive stop step 150 and the operation of the horn 42 is stopped. Then, the control is transferred to a right turn switch signal decision step 160. If the right turn switch signal decision step 160 determines that the right turn switch signal bit $b_5$ is "1", the control is transferred to a right turn lamp drive step 170 so that the right turn lamp 40 is operated and then the control is transferred to a left turn switch signal decision step 180. If the decision step 180 determines that the left turn signal bit $b_6$ is "1", the control is transferred to a left turn lamp drive step 190 and the left turn lamp 41 is operated. Then, the control is transferred to a turn cancellation routine 200. The turn cancellation routine 200 performs the computing operations shown in FIG. 7 and then the control is returned to the multiplexed signal reception routine 120. Thereafter, the microcomputer 32 repeatedly executes the operations including from the multiplexed signal reception routine 120 to the turn cancellation routine 200.

Figure 7:
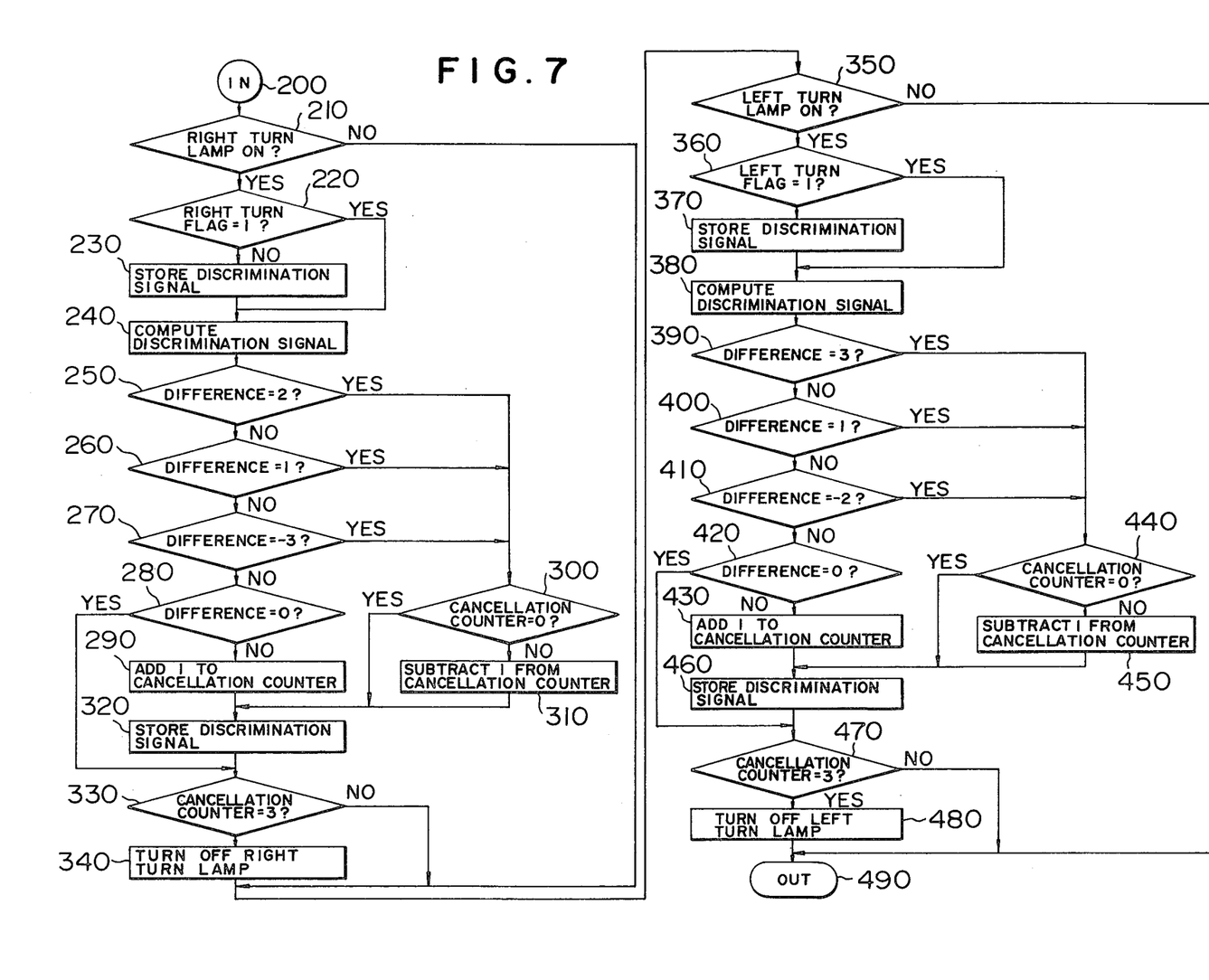
FIG. 7 is a flow chart showing the computing operations for turn cancellation purposes in the embodiment of the invention.

FIG. 7 is a flow chart showing the computing operations of the turn cancellation routine 200 of FIG. 6. When the control arrives at the turn cancellation routine 200, the control is first transferred to a right turn lamp drive decision step 210. The right turn lamp drive decision step 210 determines whether the right turn lamp 40 has been operated by the right turn lamp drive step 170 of FIG. 6, so that if the right turn lamp 40 is on, the decision results in "YES" and the control is transferred to a right turn flag decision step 220. The decision step 220 determines whether the right turn flag is "1" or "0". If the flag is "1", the control is transferred to a discrimination signal computing step 240. If the flag is "0", the decision results in "NO" and the control is transferred to a discrimination signal storage step 230. The storage step 230 stores the discrimination signals or the bits $b_1$, $b_2$ and $b_3$ in the multiplexed signal of FIG. 5 and the right turn flag is set to "1". In other words, the discrimination signal indicative of the closing of the right turn switch 20 is stored and then the control is transferred to the discrimination signal computing step 240. The computing step 240 subtracts the discrimination signal or code received by the multiplexed signal reception routine 120 from the discrimination signal stored by the discrimination signal storage steps 230 and 320. In other words, the following computation is performed.

(old discrimination signal)−(new discrimination signal) (1)

And then the control is transferred to a first computation result decision step 250. Here, the values of the discrimination signals are determined so that the bits $b_3$, $b_2$ and $b_1$ respectively represent 1, 2 and 4. The first computation result decision step 240 determines whether the computation result is 2. If the result is 2, the decision results in "YES" and the control is transferred to a cancellation counter decision step 300. If the computation result is other than 2, the decision results in "NO" and the control is transferred to a second computation result decision step 260. The decision step 260 determines whether the computation result is 1. If the result is 1, the decision results in "YES" and the control is transferred to the cancellation counter decision step 300. If the result is other than 1, the decision results in "NO" and the control is transferred to a third computation result decision step 270. The decision step 270 determines whether the computation result is −3. If the result is −3, the decision results in "YES" and the control is transferred to the cancellation counter decision step 300. If the computation result is other than −3, the decision results in "NO" and the control is transferred to a fourth computation result decision step 280. If the decision step 280 determines that the computation result is 0, the control is transferred to a cancellation counter decision step 330. If the result is other than 0, the decision results in "NO" and the control is transferred to a cancellation counter addition step 290 thus incrementing the content of the cancellation counter by 1. In other words, the computation of (old discrimination signal−new discrimination signal) is performed and the computation result is determined by the decision steps 250, 260 and 270 thus determining the turning of the steering wheel 1 in the left direction. Then, if the decision of the first, second or third computation result decision steps 250, 260 and 270 results in "YES" so that the control is transferred to the cancellation counter decision step 300, the microcomputer 32 determines whether the value of the cancellation counter is 0. If the value is 0, the control is transferred to the discrimination signal storage step 320. If the value of the cancellation counter is other than 0, the decision results in "NO" and the control is transferred to a cancellation counter subtraction step 310. Thus, the value of the cancellation counter is decremented by 1 and the control is transferred to the discrimination signal storage step 320. The storage step 320 stores the new discrimination signal computed by the discrimination signal computing step 240 in the storage location where the old discrimination signal was previously stored. Then, the control is transferred to the cancellation counter decision step 330 which in turn determines whether the value of the cancellation counter is 3. If the value is 0, 1 or 2, the decision results in "NO" and the control is transferred to a left turn lamp drive decision step 350. If the value is 3, it results in "YES" and the control is transferred to a right turn lamp drive stop step 340 thus stopping the operation of the right turn lamp 40, resetting the right turn flag and clearing the cancellation counter. Then, the control is transferred to the left turn lamp drive decision step 350. To stop the operation of the right turn lamp 40 when the value of the cancellation count is 3 signifies that the steering wheel 1 has been turned 180°. The turn cancellation computing operations in the case of a right turn have been described so far. The turn cancellation computing operations for a left turn are the same with those performed for a right turn except that the decision values of computation result decision steps 390, 400 and 410 are different from those used in the case of a right turn.

Figure 9:
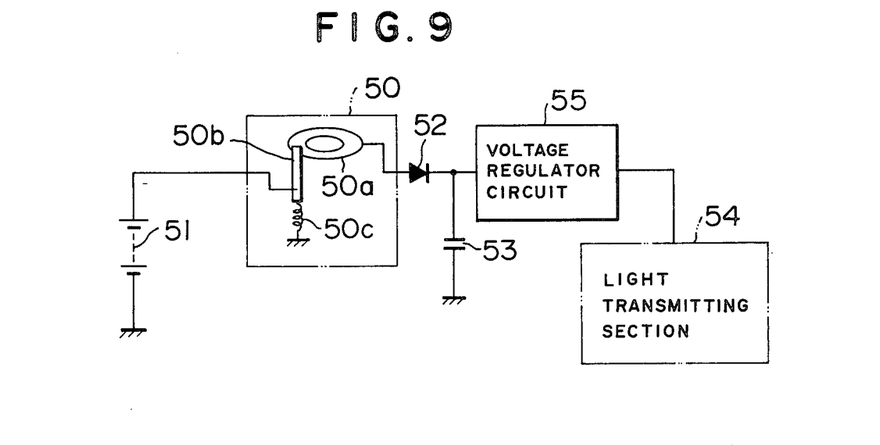
FIG. 9 is a system diagram showing the power supply system for the light transmitting section in the embodiment of the invention.

FIG. 9 is a system diagram showing the power supply system of the light transmitting section 54, in which numeral 50 designates an electric connector (a slip ring) which makes a sliding contact between the rotating and fixed parts of the steering system and it comprises a disk 50a mounted on the rotating part, a contactor 50b mounted on the fixed part and a spring 50c for pressing the contactor 50b against the disk 50a. Numeral 52 designates a diode, 53 a capacitor and 55 a voltage regulator circuit, whereby the light transmitting section 54 is supplied with a 5-volt stabilized voltage produced from the 12-volt power supply voltage supplied from a vehicle battery 51 via the electric connector 50, the diode 52 and the capacitor 53. In FIG. 9, a battery may be provided on the side of the steering wheel 1 in place of the electric connector 50. The power is supplied from the vehicle battery 51, etc., to the light receiving side circuitry on the vehicle body.

Next, the overall operation of the embodiment of this invention will be described in due course. Now, with the phototransistor 12 and the LED 11A in the opposing positions of ① in FIG. 8, if the right turn switch 20 and the horn switch 22 are closed, the multiplexing circuit 23 respectively delivers multiplexed signals A, B and C including the horn switch signal $b_4=1$ and the right turn switch signal $b_5=1$ to the transistors 24A, 24B and 24C as shown in FIG. 5. Thus, the LEDs 11A to 11D emit light and the phototransistor 12 receives only the light from the LED 11A. The phototransistor 12 converts the received multiplexed signal A to an electric signal so that the signal is amplified by the amplifier 31 and applied to the microcomputer 32. The microcomputer 32 starts the computing operations of FIG. 6 so that the multiplexed signal reception routine 120 starts receiving the bits including from the start bit $b_0$ to the left turn switch signal $b_6$. Thus, the discrimination signals $b_1=1$, $b_2=0$ and $b_3=0$ or the discrimination signal $b_1=4$, the horn switch signal $b_4=1$, the right turn switch signal $b_5=1$ and the left turn switch signal $b_6=0$ and the control is transferred to the horn switch signal decision step 130. Since the horn switch signal $b_4=1$, the decision of the horn switch signal decision step 130 results in "YES" and the horn drive step 140 causes the horn 42 to produce a blowing sound. Then, the control is transferred to the right turn switch signal decision step 160 which in turn makes a decision on the right turn switch signal $b_5$. The decision results in "YES" so that the control is transferred to the right turn lamp drive step 170 and the right turn lamp 40 starts flashing on and off. Then, the control is transferred to the left turn switch signal decision step 180. The decision of the step results in "NO" and the control is transferred to the turn cancellation routine 200. With the turn cancellation routine 200, firstly the right turn lamp drive decision step 210 determines whether the right turn lamp 40 is on. The decision results in "YES" and thus the control is transferred to the right turn flag decision step 220. The decision results in "NO" since the right turn flag has been reset to "0" by the initialization step 110. As a result, the control is transferred to the discrimination signal storage step 230 so that the discrimination signals $b_1=1$, $b_2=0$ and $b_3=0$ or the discrimination signal 4 is stored and a "1" is set into the right turn flag. Then, the control is transferred to the discrimination signal computing step 240 so that the computation of (old discrimination signal 4 − new discrimination signal 4) is performed and then the control is transferred to the first computation result decision step 250. The decision of the step 250 results in "NO" and the control is transferred to the second computation result decision step 260. The decision of the step 260 also results in "NO" and the control is transferred to the third computation result decision step 270. The decision of the step 270 also results in "NO" and the control is transferred to the fourth computation result decision step 280. Since the computation result of the discrimination signal computing step 240 is zero, the decision of the step 280 results in "YES" and the control is transferred to the cancellation counter decision step 330. The decision of the step 330 results in "NO" since the content of the cancellation counter is zero, and then the control is transferred to the left turn lamp drive decision step 350. The decision of the step 350 results in "NO" and the control is transferred to the multiplexed signal reception routine 120 via an out step 490. Then, if the steering wheel 1 is turned 60° to the left so that the LED 11F and the phototransistor 12 face each other as shown in ⑤ of FIG. 8, the phototransistor 12 receives the multiplexed signal C shown in FIG. 5 and its output is supplied to and amplified by the amplifier circuit 31. The microcomputer 32 receives by the multiplexed signal reception routine 120 the output signal of the amplifier circuit 31 or the discrimination signals $b_1=0$, $b_2=0$ and $b_3=1$ or the discrimination signal 1, the horn switch signal $b_4=1$, the right turn switch signal $b_5=0$ and the left turn switch signal $b_6=0$, and then the control is transferred to the horn switch signal decision step 130. The decision of the step 130 results in "YES" and thus the control is transferred to the horn drive step 140 which in turn operates the horn 42. Then, the control is transferred to the right turn switch signal decision step 160. The decision of the step 160 results in "NO" and the control is transferred to the left turn switch signal decision step 180. In this case, the right turn lamp 40 is repeatedly performing its flashing operation. The decision of the left turn switch signal decision step 180 results in "NO" and thus the control is transferred to the turn cancellation routine 200. With the turn cancellation routine 200, firstly the right turn lamp drive decision step 210 determines whether the right turn lamp 40 is on. The decision of the step 210 results in "YES" and the control is transferred to the right turn flag decision step 220. The decision results in "YES" and the control is transferred to the discrimination signal computing step 240 and the discrimination signal 1 received lately by the discrimination signal reception routine 120 is subtracted from the discrimination signal 4 stored in the case of ① in FIG. 8. In other words, the computation of (old discrimination signal 4 − new discrimination signal 1 = 3) is performed. As a result, the decisions of the following computation result decision steps 250, 260, 270 and 280 result in "NO" and the control is transferred to the cancellation counter addition step 290 thus incrementing the cancellation counter by 1. Then, the discrimination signal storage step 320 stores the discrimination signal 1 and the control is transferred to the cancellation counter decision step 330. The decision of the step 330 results in "NO" and the control is transferred to the left turn lamp drive decision step 350. The decision of the step 350 results in "NO" and the control is transferred to the multiplexed signal reception routine 120 via the out step 490.

Figure 8:
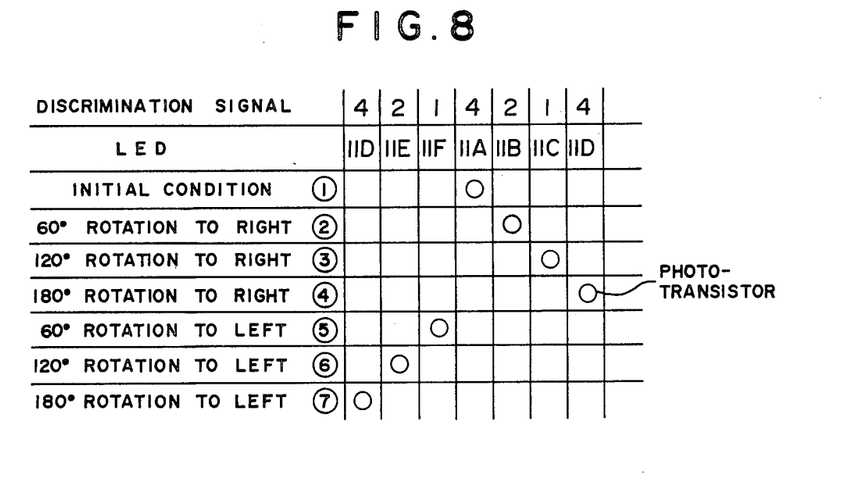
FIG. 8 is an operating state diagram useful for explaining the operation of the embodiment of the invention.

Then, if the steering wheel 1 is further turned to the left through 60°, this results in the condition of ⑥ in FIG. 8 where the phototransistor 12 faces the LED 11E and thus the phototransistor 12 receives the multiplexed signal B in FIG. 5. As a result, the microcomputer 32 receives the discrimination signals $b_1=0$, $b_2=1$ and $b_3=0$ or the discrimination signal 2, the horn switch signal $b_4=1$, the right turn switch signal $b_5=0$ and the left turn switch signal $b_6=0$ and the similar computation as in the case of ⑤ in FIG. 8 is performed. In this case, the discrimination signal computing step 240 of FIG. 7 performs the computation of (old discrimination signal 1 − new discrimination signal 2 = −1). As a result, the cancellation counter addition step 290 increments the cancellation counter by 1 and its content becomes 2. Also the discrimination signal 2 is stored by the discrimination signal storage step 320. Then, the control is transferred to the multiplexed signal reception routine 120 via the out step 490.

Then, if the steering wheel 1 is further turned to the left through 60°, there results the condition of ⑦ in FIG. 8 where the phototransistor 12 faces the LED 11D and thus the phototransistor 12 receives the multiplexed signal A in FIG. 5. As a result, the microcomputer 32 receives the discrimination signals $b_1=1$, $b_2=0$ and $b_3=0$ or the discrimination signal 4, the horn switch signal $b_4=1$, the right turn switch signal $b_5=0$ and the left turn switch signal $b_6=0$ and the similar computation as in the case of ⑤ in FIG. 8 is performed. In this case, the discrimination signal computing step 240 performs the computation of (old discrimination signal 2 − new discrimination signal 4 = −2). As a result, the cancellation counter is incremented by 1 by the cancellation counter addition step 290 and its content becomes 3. Thus, the decision of the cancellation counter decision step 330 results in "YES" and the control is transferred to the right turn lamp drive stop step 340 thus stopping the flashing operation of the right turn lamp 40. Then, the right turn flag is reset and the cancellation counter is cleared. In other words, with the right turn lamp 40 flashing on and off, if the steering wheel 1 is turned 180° to the left, the operation of the right turn lamp 40 is stopped automatically. On the other hand, if the left turn lamp 41 is turned on and then the steering wheel 1 is turned 180° to the right, the left turn lamp 41 will be stopped automatically in the like manner as previously.

Next, the operation of the apparatus will be described with reference to a case where the condition of ⑤ in FIG. 8 is brought about by closing the right turn switch 20 and turning the steering wheel 1 by 60° to the left in the condition of ① in FIG. 8 and then the steering wheel 1 is turned 60° to the right (① in FIG. 8), further 60° to the right (② in FIG. 8) and further 180° to the left.

When the steering wheel 1 is turned 60° to the left in the condition of ① in FIG. 8, the phototransistor 12 comes into the condition of ⑤ in FIG. 8. As a result, the cancellation counter is incremented by 1 by the cancellation counter addition step 290 and its content becomes 1. Thus, the discrimination signal storage step 320 stores the discrimination signal 1.

Then, as the steering wheel 1 is turned 60° to the right so that the condition of ① in FIG. 8 results, the microcomputer 32 performs by the discrimination signal computing circuit 240 the computation of (old discrimination signal 1−new discrimination signal 4=−3). As a result, the decision of the third computation result decision step 270 results in "YES" and the control is transferred to the cancellation counter decision step 300. The decision of the step 300 results in "NO" since the content of the cancellation counter is 1. Thus, the cancellation counter subtraction step 310 decrements the cancellation counter by 1 and its content becomes zero. Then, the control is transferred to the discrimination signal storage step 320 and the discrimination signal 4 is stored.

When the steering wheel 1 is further turned 60° to the right, the phototransistor 12 comes into the condition of ② in FIG. 8, the microcomputer 32 performs by the discrimination signal computing step 240 the computation of (old discrimination signal 4−new discrimination signal 2=2). As a result, the decision of the first computation result decision step 250 results in "YES" and the control is transferred to the cancellation counter decision step 300. The decision of the step 300 results in "YES" since the content of the cancellation counter is zero. Then, the discrimination signal storage step 320 stores the discrimination signal 2. Then, when the steering wheel 1 is turned 60° to the left, the phototransistor 12 is brought into the condition of ① in FIG. 8 and the microcomputer 32 performs by the discrimination signal computing step 240 the computation of (old discrimination signal 2—new discrimination signal 4=−2). As a result, the decisions of the computation result decision steps 250, 260, 270 and 280 result in "NO" and the cancellation counter addition step 290 increments the cancellation counter by 1 and its content becomes 1. Then, the discrimination signal storage step 320 stores the discrimination signal 4.

When the steering wheel 1 is further turned 60° to the left, the cancellation count 1 is incremented by 1 and its content becomes 2 as mentioned previously.

Then, the steering wheel 1 is further turned 60° to the left, the phototransistor 12 comes into the condition of ⑥ in FIG. 8 so that the cancellation counter is incremented by 1 and its content becomes 3. As a result, the decision of the cancellation counter decision step 330 results in "YES" and the control is transferred to the right turn lamp drive stop step 340 thus stopping the operation of the right turn lamp 40.

While, in the embodiment described above, the plurality of light-emitting devices 11A to 11F are mounted on the steering wheel side and the single light-sensitive device 12 is mounted on the vehicle body side whereby optically transmitting a multiplexed signal including signals for discriminating the positions of the light-emitting devices, the present invention is not intended to be limited to this type. For instance, any other type may be used in which for example, a single-light emitting device is mounted on the steering wheel side and as shown in FIG. 2c a plurality of light-sensitive devices 12 and 12A are arranged at predetermined spaces along the circumference on the vehicle body side facing the light-emitting device whereby the output signals of the light-sensitive devices are separately taken out and changes in the order in which the light is received are discriminated thus detecting the rotary movement of the steering wheel.

It will thus be seen from the foregoing description that the present invention has a great advantage that the right turn switch and the left turn switch are mounted on the steering wheel whereby the driver is allowed to turn on the right turn switch and the left turn switch while holding the steering wheel thus ensuring safe driving and that the rotary movement of the steering wheel is detected in accordance with the shifting of light signals received by the light-sensitive device due to the shifting of the light-emitting device positions caused by the turning of the steering wheel thus effecting the turn signal cancellation without any mechanical cam mechanism, thus reducing the possibility of troubles and improving the reliability of the apparatus by means of the signal transmission from the steering wheel to the vehicle body side which transmits multiplexed signals by contactless optical transmission.

We claim:

1. A multiple signal transmitting apparatus for automobiles comprising:
   a plurality of switches mounted on a steering wheel of an automobile;
   a multiplexing circuit mounted on said steering wheel for multiplexing signals from said switches to generate a multiplexed signal;
   at least one light-emitting means mounted on a surface of said steering wheel facing a means for supporting said steering wheel, said light-emitting means being assigned with a discrimination signal which differs depending on a mounting location on the steering wheel, said light-emitting means being responsive to said multiplexed signal together with said discrimination signal from said multiplexing circuit to generate a light signal;
   at least one light-sensitive means mounted on a surface of said support means facing said light-emitting means for receiving said light signal when said light-emitting means is aligned with said light-receiving means due to a rotation of said steering wheel to generate a signal corresponding thereto; and
   a decoder circuit arranged on a vehicle body of said automobile for decoding an output signal of said light-sensitive means to generate signals corresponding to the signals from said plurality of switches and said discrimination signal indicative of a rotational position of said steering wheel.

2. An apparatus according to claim 1, wherein a plurality of said light-emitting means are arranged on said steering wheel at equal spaces along a circumference centering around a steering shaft of said steering wheel so as to be rotated together with said steering wheel, and wherein said light-sensitive means is fixedly mounted on said support means in such a manner that said light-sensitive means is arranged on another circumference lying on a plane parallel to or on the same plane as that defined by said light-emitting means and having the center thereof lying on the center line of said steering shaft so as to be apart by a given space from said light-emitting means.

3. An apparatus according to claim 1, wherein said light-emitting means on said steering wheel is arranged on a circumference centering around a steering shaft on said steering wheel so as to be rotated together with said steering wheel, and wherein a plurality of said light-sensitive means are fixedly mounted on said support means in such a manner that said light-sensitive means are arranged along another circumference lying on a plane parallel to or on the same plane as that on which said light-emitting means rotates and having the center thereof lying on the center line of said steering shaft so as to be apart by a given space from said light-emitting means.

4. A multiple signal transmitting apparatus for automobiles comprising:

a plurality of switches mounted on a steering wheel of an automobile for respectively generating signals upon actuation thereof;

a plurality of light-emitting means arranged along a circumference of a surface rotatable together with said steering wheel, said circumference centering around a shaft of said steering wheel, each of said plurality of light-emitting means being assigned with a discrimination signal indicative of a mounting position thereof along said circumference;

a multiplexing circuit connected to said plurality of switches to receive the switch signals therefrom, said multiplexing circuit being adapted to multiplex said switch signals and said discrimination signal assigned to said each light-emitting means thereby to transmit the multiplexed signal through said plurality of light-emitting means;

light-sensitive means arranged on an opposing surface on a vehicle body side which is spaced apart by a given space from said surface having said light-emitting means arranged thereon, said light-sensitive means receiving said multiplexed signal from one of said plurality of light-emitting means aligned to said light-sensitive means depending on the rotation of said steering wheel; and signal processing means connected to said light-sensitive means for separating said switch signals and said discrimination signal of said one light-emitting means in said multiplexed signal and for detecting a rotational position of said steering wheel on the basis of the separated discrimination signal indicative of said mounting position of said one light-emitting means.

5. An apparatus according to claim 4, wherein power is applied to a voltage regulator mounted on a rotating part of said steering wheel through sliding contact of a fixed conductor connected to a power source with another disk-shaped conductor connected to said voltage regulator, said another conductor being rotatable in accordance with rotation of said steering wheel, and wherein power is supplied to said multiplexing circuit and said light emitting means, both mounted on the rotating part of said steering wheel, through said voltage regulator, whereby said multiplexing circuit and said drive circuit are supplied with power through said voltage regulator circuit.

6. An apparatus according to claim 4, wherein said plurality of light-emitting means are driven by said multiplexed signal to generate a light signal, and wherein said signal processing means controls corresponding load means in accordance with the separated switch signals.

7. An apparatus according to claim 4, wherein said plurality of switches includes a turn signal lamp, and said signal processing means successively stores the separated discrimination signal and compares the current discrimination signal with the previously stored discrimination signal to determine a rotational direction and position of said steering wheel; and said turn signal lamp is turned off when said steering wheel is rotated in a direction indicated by said turn signal lamp by a predetermined rotational angle from a position at which said turn signal lamp is turned on; and said turn signal lamp is also turned off when said steering wheel is rotated in a reverse direction by a predetermined angle after said steering wheel has been rotated in a direction indicated by said turn signal lamp.

* * * * *